(12) United States Patent
Ali et al.

(10) Patent No.: US 10,588,071 B2
(45) Date of Patent: *Mar. 10, 2020

(54) WIRELESS COMMUNICATION SYSTEM, METHOD OF ROUTING DATA IN A WIRELESS COMMUNICATION SYSTEM, AND METHOD OF HANDING OVER A WIRELESS COMMUNICATION DEVICE, HAVING AN ESTABLISHED DATA CONNECTION TO A LOCAL NETWORK

(71) Applicant: Google Technology Holdings LLC, Mountain View, CA (US)

(72) Inventors: Irfan Ali, Istanbul (TR); Apostolis K. Salkintzis, Athens (GR); Xiang Xu, Beijing (CN)

(73) Assignee: Google Technology Holdings LLC, Mountain View, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/496,749

(22) Filed: Apr. 25, 2017

(65) Prior Publication Data

US 2017/0295527 A1    Oct. 12, 2017

Related U.S. Application Data

(63) Continuation of application No. 13/879,878, filed as application No. PCT/CN2010/078500 on Nov. 8, 2010, now Pat. No. 9,668,199.

(51) Int. Cl.
*H04W 40/34* (2009.01)
*H04W 36/08* (2009.01)
(Continued)

(52) U.S. Cl.
CPC ....... *H04W 40/36* (2013.01); *H04W 36/0005* (2013.01); *H04W 36/08* (2013.01);
(Continued)

(58) Field of Classification Search
None
See application file for complete search history.

(56) References Cited

U.S. PATENT DOCUMENTS 8,422,452 B2 *  4/2013  Zembutsu ............. H04W 36/00
                                                        370/329
8,693,367 B2 *  4/2014  Chowdhury ............ H04L 12/14
                                                        370/253
(Continued)

FOREIGN PATENT DOCUMENTS

CN       101645814 A     2/2010
CN       101656993 A     2/2010
(Continued)

OTHER PUBLICATIONS

3GPP Technical Specification Group Services and System Aspects; 3GPP TS 23.401V10.1.0; General Packet Radio Service (GPRS) enhancements for Evolved Universal Terrestrial Radio Access Network (E-UTRAN) Access (Release 10); pp. 70-79, Chapter 5.3.2.

*Primary Examiner* — Ajit Patel
(74) *Attorney, Agent, or Firm* — Lerner, David, Littenberg, Krumholz & Mentlik, LLP

(57) ABSTRACT

A wireless communication system (100) comprises a plurality of access points (102) for communicating with a plurality of wireless communication devices (104) within an enterprise (106). A local gateway (108) provides access to a local network (110) within the enterprise and an access point gateway (114) is coupled to the local gateway (108) and is communicably coupled to each of the plurality of access points (102) and to a core network (116) of the wireless communication system. The access point gateway (114) is arranged to receive control messages sent between the core network (116) and the plurality of access points (102) via the access point gateway (114) and to selectively route data via at least one of a communication path (118) between the (Continued)

access points (102) and the core network (116) and a communication path (120) between an access point (102) and the local network (110) via the local gateway (108) based on a received control message. A method of routing data and a method of handing over a wireless communication device, having an established data connection to a local network, is also claimed and disclosed.

20 Claims, 11 Drawing Sheets

(51) Int. Cl.
H04W 40/36 (2009.01)
H04W 36/00 (2009.01)
H04W 84/10 (2009.01)
H04W 36/12 (2009.01)

(52) U.S. Cl.
CPC ........ H04W 36/125 (2018.08); H04W 40/34 (2013.01); H04W 84/10 (2013.01)

(56) References Cited

U.S. PATENT DOCUMENTS

| | | | |
|---|---|---|---|
| 8,862,148 B2 * | 10/2014 | Stojanovski | H04W 48/17 455/456.1 |
| 8,971,290 B2 * | 3/2015 | Liang | H04W 76/34 370/331 |
| 2002/0191595 A1 * | 12/2002 | Mar | H04W 84/10 370/352 |
| 2009/0232019 A1 * | 9/2009 | Gupta | H04L 12/287 370/252 |
| 2010/0125899 A1 * | 5/2010 | Tinnakornsrisuphap | H04L 63/101 726/12 |
| 2010/0272013 A1 * | 10/2010 | Horn | H04W 76/12 370/328 |
| 2010/0278108 A1 * | 11/2010 | Cho | H04W 76/12 370/328 |
| 2011/0065427 A1 | 3/2011 | Landgren et al. | |
| 2011/0103310 A1 | 5/2011 | Stojanovski et al. | |
| 2011/0141947 A1 | 6/2011 | Li et al. | |
| 2011/0171953 A1 * | 7/2011 | Faccin | H04W 48/08 455/426.1 |
| 2012/0039213 A1 | 2/2012 | Cheng et al. | |
| 2012/0039304 A1 * | 2/2012 | Kim | H04W 28/08 370/332 |
| 2012/0044949 A1 * | 2/2012 | Velev | H04W 8/082 370/401 |
| 2012/0076047 A1 * | 3/2012 | Turanyi | H04W 76/02 370/254 |
| 2012/0207137 A1 * | 8/2012 | Zhou | H04L 41/12 370/331 |
| 2012/0214445 A1 * | 8/2012 | Stojanovski | H04L 63/164 455/411 |

FOREIGN PATENT DOCUMENTS

| | | |
|---|---|---|
| CN | 101765218 A | 6/2010 |
| WO | 2010071529 A1 | 6/2010 |

* cited by examiner

WIRELESS COMMUNICATION SYSTEM, METHOD OF ROUTING DATA IN A WIRELESS COMMUNICATION SYSTEM, AND METHOD OF HANDING OVER A WIRELESS COMMUNICATION DEVICE, HAVING AN ESTABLISHED DATA CONNECTION TO A LOCAL NETWORK

CROSS-REFERENCE

The present application is a continuation of U.S. patent application Ser. No. 13/879,878, filed on Jul. 31, 2013, which is a national phase entry under 35 U.S.C. § 371 of International Application No. PCT/CN2010/078500, filed Nov. 8, 2010, all of which are incorporated herein by reference.

FIELD OF THE DISCLOSURE

This disclosure relates to a wireless communication system, method of routing data in a wireless communication system, and a method of handing over a wireless communication device, having an established data connection to a local network.

BACKGROUND OF THE DISCLOSURE

As is well known, wireless communication systems, such as Universal Mobile Telecommunication System (UMTS) and Long Term Evolution (LTE) systems, provide communication to mobile devices via a plurality of cells or serving areas, with each cell or area served by one or more base stations. The base stations are interconnected by a fixed network, which can communicate data between the base stations. A mobile device communicates via a radio communication link with a base station of the cell or serving area within which the mobile station is situated.

In order to extend coverage and capacity indoors, such as in residential or academic (e.g. university campus) or commercial or small business environments and especially where access would otherwise be limited or unavailable, systems with smaller sized cells served by small base stations, known as femtocells, have been developed. The third Generation Partnership Project (3GPP) refers to a UMTS femtocell that connects a 3GPP mobile device (referred to as User Equipment, UE) to a core network over UTRAN as a Home Node B (HNB). See for example, the 3GPP document TS 25.467 (UTRAN Architecture for 3G HNB), the disclosure of which is incorporated herein by reference. For LTE systems, 3GPP also refers to the femtocells as HeNBs. LTE HeNBs are part of an evolved UTRAN (EUTRAN) which connects UEs to a core network using, for example, a broadband IP backhaul.

With the increase in content available online, for example, via email, social networking sites, blogs, RSS feeds, multimedia voice-over-IP (VoIP) calls, streaming video and online music, and the availability of high-speed mobile broadband access technologies, such as LTE, there has been a significant increase in demand by users for Internet data access. Increased demand in a network impacts the network's available bandwidth and capacity.

In order to efficiently provide access to local IP networks and to offload data traffic from macro networks (thus, increase network capacity too), operators have introduced Local IP Access (LIPA) into their networks which enables IP-enabled UEs to access a consumer's residential or home-based local network (e.g. so that IP traffic generated via the HeNB is routed directly to the users local network) as well as the broader Internet directly using the air interface of a femtocell, for example a HeNB. Using LIPA facilitates the offloading of traffic from the operator's core network which is ultimately destined for the Internet and also provides access to the devices connected in the residential or home-based local network (e.g. desktop/laptop computers, printers, Internet-enabled gaming systems, media centres).

3GPP has defined a solution for providing LIPA in a residential or home-based environment in TS 23.401 and TS 23.060, the disclosures of which are incorporated herein by reference. The 3GPP solution is based on a local gateway (which provides access to the local network) collocated in a femtocell, HeNB or HNB.

3GPP is currently looking at solutions for deploying LIPA in enterprises or enterprise environments, where enterprises may include corporations, small businesses, non-profit institutions, government bodies, academic campus' or similar enterprise environments. In enterprise deployment, the coverage area is larger than a residential deployment and so a plurality of femtocells (HeNBs or HNBs) are required to provide connectivity to the local network in the enterprise. However with a plurality of femtocells in an enterprise, as a user connected to a femtocell moves beyond coverage of the femtocell but still within the enterprise, the user will loose connectivity to the local network. In view of the impact to a user, not providing continuity to LIPA beyond a femtocell is a significant drawback when deploying LIPA in enterprise environments.

Two solutions have been proposed to 3GPP for deploying LIPA in enterprise environments.

The first solution proposes using a new interface Sxx between HeNB and a local gateway (LGW) to the local network. Two versions of the new interface Sxx have been proposed. In 3GPP Tdoc written contribution meeting document S2-102432, the disclosure of which is incorporated herein by reference, it has been proposed that Sxx is a User Plane (UP) only interface and in 3GPP Tdoc written contribution meeting document S2-102433, the disclosure of which is incorporated herein by reference, it has been proposed that Sxx is a User Plane (UP) and a Control Plane (CP) interface. Both versions of this solution however require a new interface and mobility mechanism to be specified and also requires the HeNB to support GPRS Tunneling Protocol-Control (GTP-C). Thus, this solution is complex to implement and requires significant changes to the existing architecture.

The second solution proposes moving the Serving Gateway (SGW) from the core network to the enterprise and was proposed in 3GPP Tdoc written contribution meeting document S2-102180, the disclosure of which is incorporated herein by reference. This solution requires that a SGW relocation is performed every time the UE moves into or out of the enterprise area and also means that the SGW, which includes functionality such as operator charging and charging interfaces, must be moved into the enterprise. Thus, this solution requires changes to the existing architecture and additional signalling when the UE moves into or out of the enterprise area.

BRIEF DESCRIPTION OF THE DRAWINGS

A wireless communication system, a method of routing data in a wireless communication system and a method of handing over a wireless communication device, having an established data connection to a local network, in accordance with the disclosure will now be described, by way of example only, with reference to the accompanying drawings in which.

DETAILED DESCRIPTION OF THE DRAWINGS

A wireless communication device for use with the wireless communication system in accordance with the disclosure may be a portable or handheld or mobile telephone, a Personal Digital Assistant (PDA), a portable computer, portable television and/or similar mobile device or other similar communication device. In the following description, the communication device will be referred to generally as a UE for illustrative purposes and it is not intended to limit the disclosure to any particular type of communication device.

Figure 1:
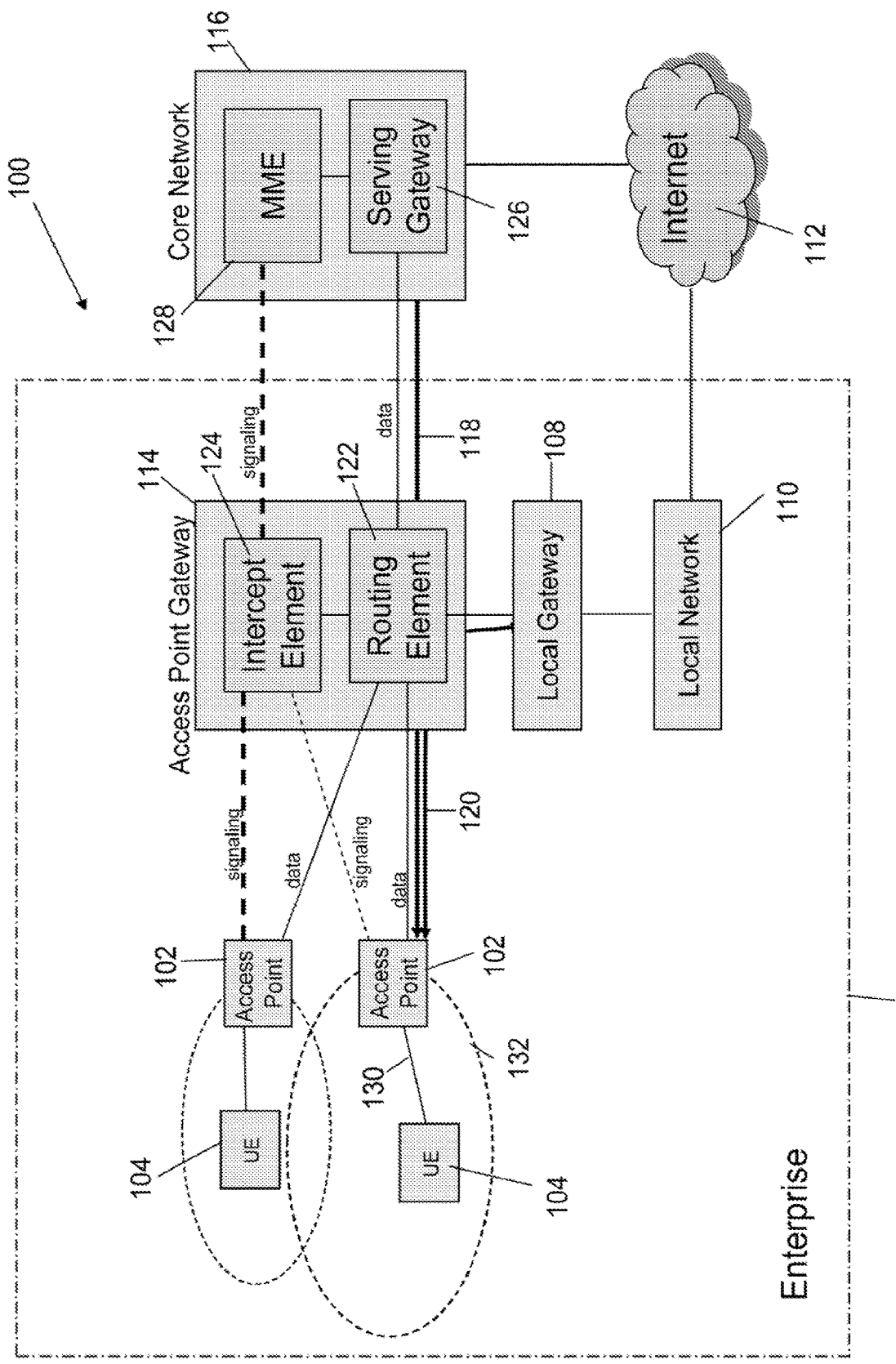
FIG. 1 is a block schematic diagram of a wireless communication system in accordance with an example embodiment of the present disclosure.

Referring now to FIG. 1, a wireless communication system 100 in accordance with an example of an embodiment of the disclosure comprises a plurality of access points 102 for communicating with a plurality of UEs 104 (only two of which are shown in FIG. 1) within an enterprise 106. The wireless communication system 100 may be a UMTS system or a LTE system or any other communication system which facilitates access to a local network in an enterprise and a core network via a plurality of access points in the enterprise. An enterprise may include a corporation, small business, non-profit institution, government body, academic body, academic campus or similar organisation that has a local network that may be accessed at several locations in the enterprise. A local gateway (L-GW) 108 provides access to a local network 110 within the enterprise 106. The local network 110 of the enterprise 106 may include network connected devices such as desktop computers, printers, scanners, lap top computers, media devices. The local network 110 may be connected to external data networks, such as the Internet 112, via a gateway such as an ISP Internet access gateway or router (not shown in FIG. 1), as is well known in the art.

The wireless communication system 100 further comprises an access point gateway 114 coupled to the local gateway L-GW 108 and to each of the plurality of access points 102, and for coupling to a core network 116 of the wireless communication system 100. Each of the access points 102 may be a femtocell or a HeNB or a HNB or any other type of similar wireless interfacing element in a wireless communication system. In the following, the access points 102 will be referred to as HeNBs and the access point gateway will be referred to as a HeNB gateway (HeNB GW) but this is for illustrative purposes only and it is not intended to limit the disclosure to HeNBs or HeNB gateways. The HeNB gateway 114 is arranged to selectively route data via at least one of a communication path 118 between the HeNBs 102 and the core network 116 and a communication path 120 between the HeNBs 102 and the local network 110 via the local gateway 108. The routed data is traffic data or user data as opposed to signalling or control data. The wireless communication system 100 may therefore provide LIPA to a UE 102 in the enterprise 106 via the HeNB gateway 114 and the local network 210.

There may be one or more HeNB gateways 114, with each of the one or more HeNB gateways coupled to a plurality of HeNBs, in a particular enterprise 106 and one or more local gateways 108.

In an example arrangement, the HeNB gateway 114 is arranged to receive or intercept control messages or signalling sent between the core network 116 and the plurality of HeNBs via the HeNB gateway 114 and to selectively route data based on the received or intercepted control messages. For example, information in the received or intercepted control messages (e.g. the presence of a correlation identifier or not as described in more detail below) may be used by the HeNB gateway 114 to selectively route data. As will be discussed in more detail below, the control messages received at the HeNB gateway 114 may, for example, be used to determine which bearers to map to the local gateway 108 and which bearers to forward onto the core network 106. Thus, a UE 104 located in the enterprise 106 may access the Internet 112 and exchange data via the plurality of HeNBs and either bearers connecting to the core network 116 or bearers connecting to the local network 110 (e.g. LIPA), with the bearers being determined by the HeNB gateway 114.

In an example arrangement, the HeNB gateway 114 may be further arranged to update the received or intercepted control messages and to forward on the updated control messages to the HeNBs 102 or core network 116. The updating by the HeNB gateway 114 of the received or intercepted control messages facilitates the control of the routing of data by the HeNB gateway 114 and also ensures that the communication path used to route the data is transparent to the HeNBs 102. For example, mechanisms may be used to associate one IP address each for the HeNB gateway 114 and the local gateway 108. The HeNB gateway 114 may then update control messages sent between a HeNB 102 and the core network 116 via the HeNB gateway 114 with the IP address associated with the local gateway 108. The core network 116 may then use the information received from the HeNB gateway 114, including the local gateway IP address, to override the normal selection algorithms and to facilitate the selection by the HeNB gateway 114 of the communication path either via the local network 110 (communication path 120) or the core network 116 (communication path 118) to route data.

In another embodiment, the HeNB gateway 114 is arranged to not update the received or intercepted control messages. In this embodiment, the HeNB 102 may be arranged to add the local gateway address to the control messages sent by the HeNB 102 to the core network 116 via the HeNB gateway 114. The HeNB 102 may be provided with the address of the local gateway, for example, via operations and management.

The routing control function of the HeNB gateway 114 may be performed by a routing element 122 of the HeNB gateway 114 and the intercepting function may be performed by an intercept element 124 of the HeNB gateway 114. More details of the operation of the routing element 122 and the intercept element 124 of the HeNB gateway 114 is given below with respect to example procedures.

In an embodiment, the HeNB gateway 114 is located in the enterprise 106. The HeNB gateway 114 may be collocated with the local gateway 108 or may be located separate to the local gateway 108. By collocating the HeNB gateway 114 and the local gateway 108, the need for a proprietary interface is avoided.

In an example embodiment, the core network 116 comprises a serving gateway (SGW) 126 that routes and forwards user data and a Mobility Management Entity (MME) 128. The MME 128 is a control node for the wireless communication system 100. The functions of the MME 128, for example, include: it is responsible for idle mode UE location tracking and paging procedures including retransmissions; it is responsible for authorizing and facilitating the bearer activation/deactivation process and is also responsible for choosing the SGW for a UE at the initial attach and at time of handover; it is responsible for authenticating the user (by interacting with the HSS); the Non-Access Stratum (NAS) signalling terminates at the MME and it is also responsible for generation and allocation of temporary identities to UEs; it checks the authorization of the UE to camp on the service provider's Public Land Mobile Network (PLMN) and enforces UE roaming restrictions. The core network 116 further comprises a packet gateway (not shown) which provides connectivity to external data networks, such as the Internet 112. The functions of the SGW 126, the MME 128 and the packet gateway (not shown) are well known in the art.

The routing element 122 of the HeNB gateway 114 routes data between the HeNBs 102 and the serving gateway 126 of the core network 116 and between the HeNBs 102 and the local gateway 108. The intercept element 124 of the HeNB gateway 114 receives or intercepts control messages or signalling communicated between the HeNBs 102 and the MME 128 of the core network 116.

A UE 104 located in the enterprise 106 communicates with one of the HeNBs 102 via a radio communication link 130 when the UE 104 is in the cell or serving area 132 served by the HeNB 102. A UE 104 located in the enterprise 106 may therefore access the Internet 112 and exchange data via the plurality of HeNBs and either the core network 116 or the local network 110 (e.g. LIPA) under the control of the HeNB gateway 114. By enabling the UE to access the Internet 112 via the local network 110, the load on the core network 116 can be reduced. The UE 104 may also access other devices connected in the local network 110 via the plurality of HeNBs and the HeNB gateway 114.

Figure 2:
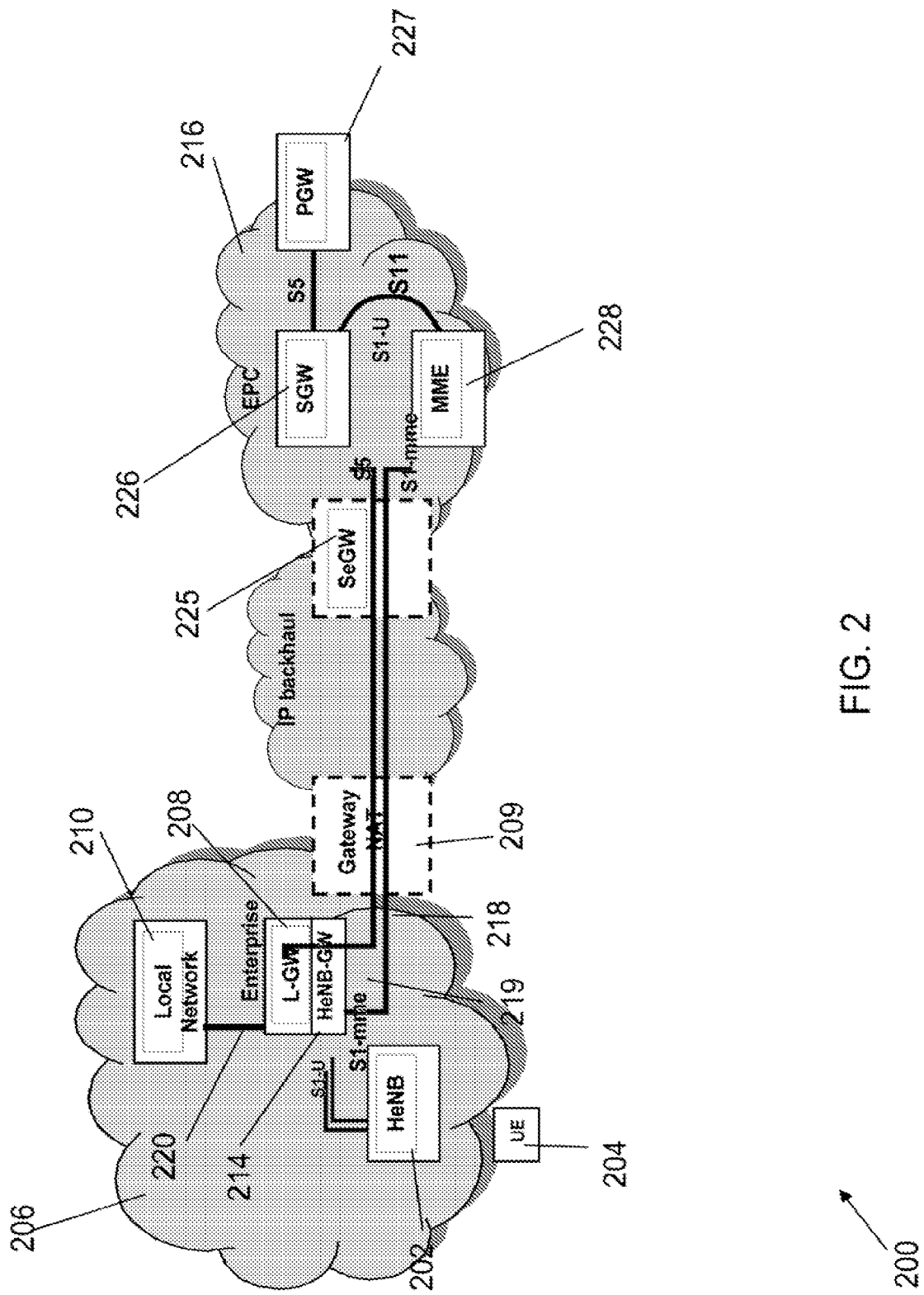
FIG. 2 is a block schematic diagram of a LTE system in accordance with an example embodiment of the present disclosure.

FIG. 2 shows an example arrangement in which the wireless communication system is a LTE system 200. Like elements to those of FIG. 1 are referenced by the same reference numeral plus the number 100 and the comments and description in relation to FIG. 1 apply to the system of FIG. 2. In this example arrangement, the HeNBs 202 are part of an EUTRAN. Other parts of the EUTRAN are not shown in FIG. 2 for simplicity. The HeNB gateway 214 is arranged to selectively route data via at least one of a communication path 218 between the HeNBs 202 and the core network 216, which in LTE systems is called the Evolved Packet Core (EPC), and a communication path 220 between the HeNBs 202 and the local network 210 via the local gateway 208. An S1-mme interface 219 is provided between the HeNBs 202 and the MME 228 via the HeNB gateway 214 so that signalling or control messages between the HeNBs 202 and the MME 228 are received or intercepted by the HeNB gateway 214 before being forwarded on. There is therefore no change required to the HeNBs 202. In an example arrangement, a security gateway (SeGW) 225 maintains a secure association with the HeNB gateway 214 instead of the HeNB 202 across the IP backhaul network which is considered insecure. The EPC 216 further comprises a packet gateway (PGW) 227 which provides connectivity to external data networks, such as the Internet (not shown in FIG. 2). A gateway 209, which is shown as gateway/NAT in FIG. 2, connects the enterprise 206 to external data networks such as the Internet, and may act as a firewall for the enterprise 206. For example, the gateway/NAT 209 may be the firewall at the enterprise 206 and may connect the enterprise 206 to the Internet via an ISP's network. It will be appreciated that not all traffic from the enterprise 206 goes to the EPC 216. Only traffic destined for the MME 228 and SGW 226 goes via the EPC 216.

In an example arrangement, IKEv2 mechanisms are used to request one IP address each for the HeNB gateway 214 and the local gateway 208. The assigned local gateway address 208 is signalled to the MME 228 by the HeNB gateway 214 via the S1-mme interface 219 in UE-associated control messages or signalling. For example, the local gateway address 208 may be added by the HeNB gateway 114 to all uplink S1-mme NAS messages and all uplink S1-mme Initial UE messages. When the UE informs the MME 228 that it wants a connection to the local network 210, the MME 228 uses the information from the HeNB gateway 214 to override the normal packet gateway (PGW) selection algorithms and select the local gateway 208. The MME 228 provides control messages which are received or intercepted by the HeNB gateway 214 and the HeNB gateway 214 uses the control messages (e.g. information in the control messages) to select a communication path either via the local network 210 (communication path 220) or the EPC 216 (communication path 218) to route data.

As will be discussed in more detail below, the control messages received at the HeNB gateway 214 from the MME 228 may, for example, be used to determine which bearers (e.g. S1-U bearers) to map to the local gateway 208 and which bearers (e.g. S1-U bearers) to forward onto the EPC 206.

Example methods for performing procedures in the wireless communication system in accordance with the present disclosure will now be described with reference to the LTE communication system 200 shown in FIG. 2 and the message flow diagrams of FIGS. 3-8. It will however be appreciated that the following methods may be used for procedures in other wireless communication systems and it is not intended that the following be limited to LTE systems only.

Figure 3:
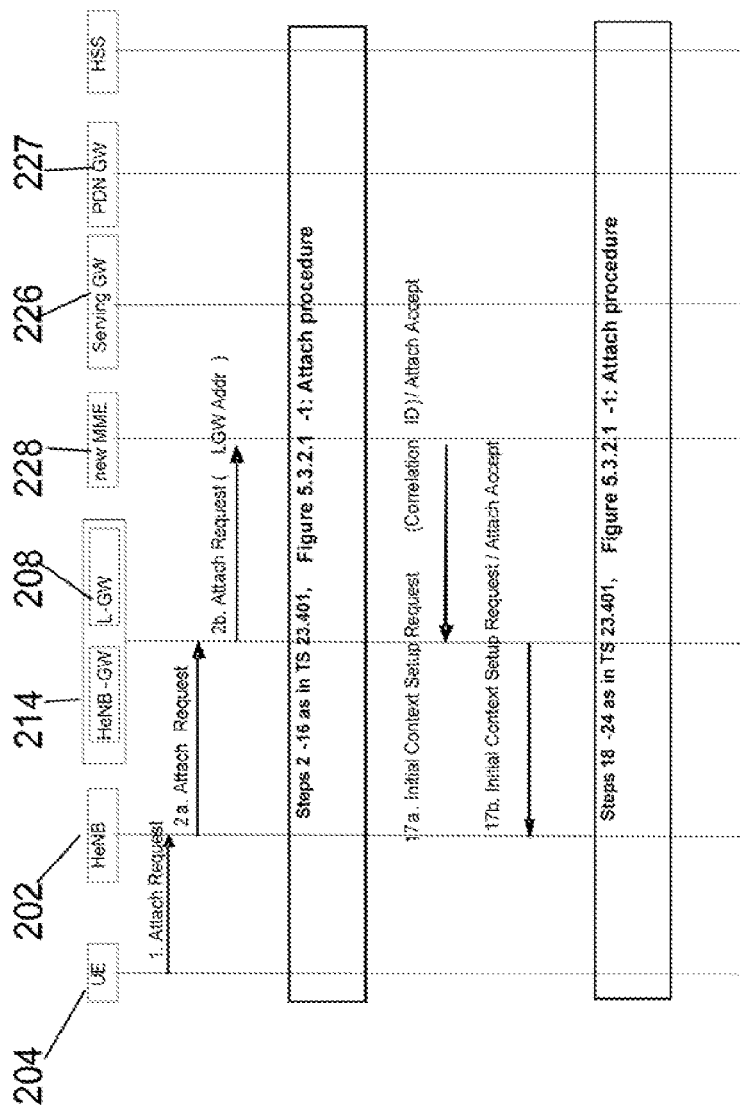
FIG. 3 is a diagram showing example message flows between the wireless communication device and elements of the wireless communication system of FIG. 2 for an attach procedure in accordance with the present disclosure.

FIG. 3 shows an example message flow for an attach procedure in accordance with an example of an embodiment of the disclosure. A Home Security System (HSS), which is part of the EPC 216 but not shown in FIG. 2 is used to authenticate UEs and contains authentication and subscription data for users.

On turn-on, for example, a UE 204 sends an attach request message to the HeNB 202 serving the cell or serving area in which the UE 204 is located, step 1. The attach request message is sent from the HeNB 202 and intercepted or received by the HeNB gateway 214, step 2a. The HeNB gateway 214 updates the attach request message by adding the address of the local gateway 208 (e.g. the IP address associated with the local gateway 208 by a IKEv2 mechanism) to the received attach request message and forwards the updated attach request message to the MME 228 via the HeNB gateway 214, step 2b. The steps then follow the normal attach procedure as set out in the equivalent procedure of the Rel-10 LIPA PDN connection flows in 3GPP document TS 23.401, the disclosure of which is incorporated herein by reference. See steps 2-16 in TS 23.401, FIG. 5.3.2.1-1: Attach procedure. However, instead of step 17 of the normal attach procedure as set out FIG. 5.3.2.1-1, the message flow in accordance with the disclosure has two steps, step 17a and 17b. In step 17a, a context set up request message including an attach accept message destined for the UE 204 is sent from the MME 228 to the HeNB 202 via the HeNB gateway 214. The context set up request message includes a correlation identifier (ID) provided by the MME 228. When the HeNB gateway 214 receives the context set up request message including a correlation ID from the MME 228, the HeNB gateway 214 updates the received context set up request message by removing the correlation ID from the received message before forwarding the updated message to the HeNB 202, in step 17b. The HeNB gateway 214 may selectively route data via the communication path between the HeNB 202 and the local network 210 via the local gateway 208 in response to the correlation ID in the received context set up request message.

In an example arrangement, the correlation ID identifies a radio access bearer which may be one of a plurality of radio access bearers for routing data via the communication path 220 to the local network 210. The correlation ID may then be used by the HeNB gateway 214 to provide a direct path for uplink and downlink data packets for the LIPA connection for the particular LIPA bearers. The correlation ID is not forwarded to the HeNB and thus, there is no impact on the HeNB 202. If the control message (e.g. the received context set up request message) intercepted or received by the HeNB gateway 214 from the MME 226 does not include a correlation ID, the HeNB gateway 214 then determines that the data should be routed via the core network 206.

Figure 4:
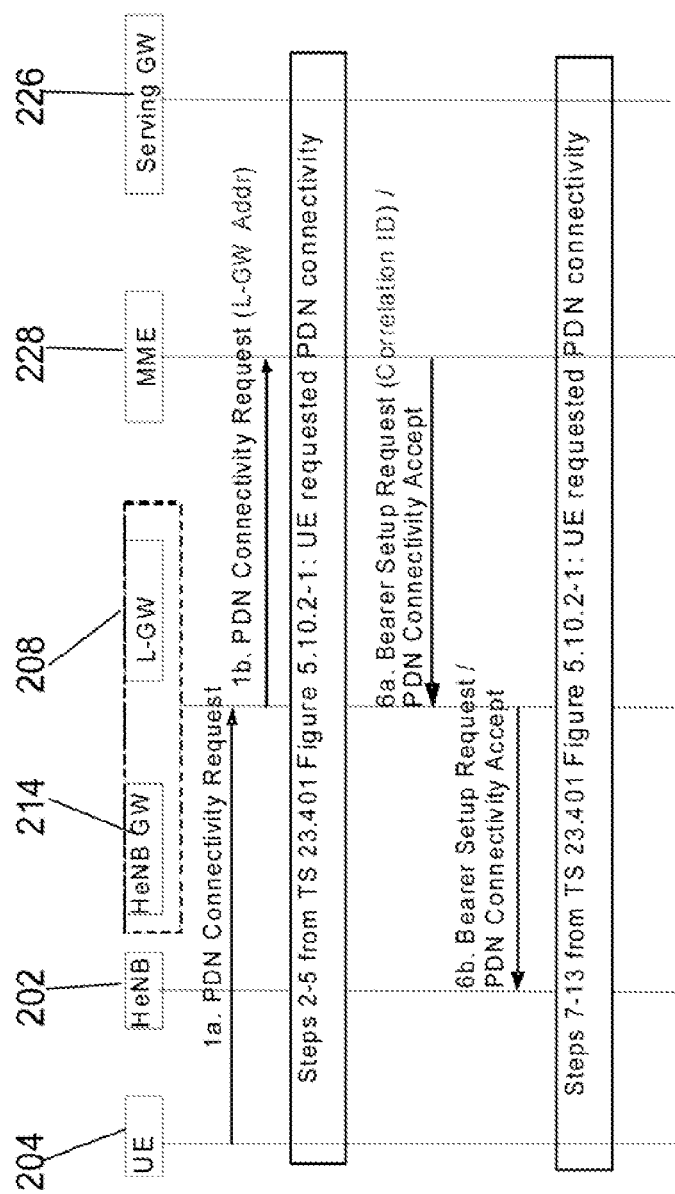
FIG. 4 is a diagram showing example message flows between the wireless communication device and elements of the wireless communication system of FIG. 2 for a procedure involving a device requested packet data network connection via a local network in an enterprise.

FIG. 4 shows an example message flow for a procedure involving UE requested packet data network connectivity via a local network in an enterprise (e.g. LIPA via local network 210). In step 1a, a packet data network (PDN) request message is sent from the UE 204 via the HeNB 202 to the MME 228. The HeNB gateway 214 receives or intercepts the PDN request message and updates the PDN request message by adding the address of the local gateway 208 (e.g. the IP address associated with the local gateway 208 by an IKEv2 mechanism) to the received PDN request message and forwards the updated message to the MME 228, step 1b. The steps then follow the normal procedure as set out in the equivalent procedure of the Rel-10 LIPA PDN connection flows in 3GPP document TS 23.401 to create a session (see steps 2-5 from TS 23.401 FIG. 5.10.2-1: UE requested PDN connectivity) until step 6a, when a bearer set up request message including a PDN connectivity accept message destined for the UE 204 is sent from the MME 228 to the HeNB 202 via the HeNB gateway 214. The bearer set up request message includes a correlation identifier (ID), such as a local gateway tunneling identifier (S5 LGW TEID), provided by the MME 228. When the HeNB gateway 214 receives the bearer set up request message including a correlation ID from the MME 228, the HeNB gateway 214 updates the received bearer set up request message by removing the correlation ID from the received message before forwarding the updated message to the HeNB 202. The HeNB gateway 214 may selectively route data via the communication path between the HeNB 202 and the local network 210 via the local gateway 208 in response to the correlation ID in the received bearer set up request message.

In an example arrangement, the correlation ID identifies a radio access bearer which may be one of plurality of radio access bearers for routing data via the communication path 220 to the local network 210. The correlation ID may then be used by the HeNB gateway 214 to determine which S1-U bearer from the HeNB 202 is to provide the direct path to the local gateway 208. The correlation ID is not forwarded to the HeNB 202 and thus, there is no impact on the HeNB 202. If the control message (e.g. the received bearer set up request message) intercepted or received by the HeNB gateway 214 from the MME 228 does not include a correlation ID, the HeNB gateway 214 then determines that the data should be routed via the core network 206.

Figure 5:
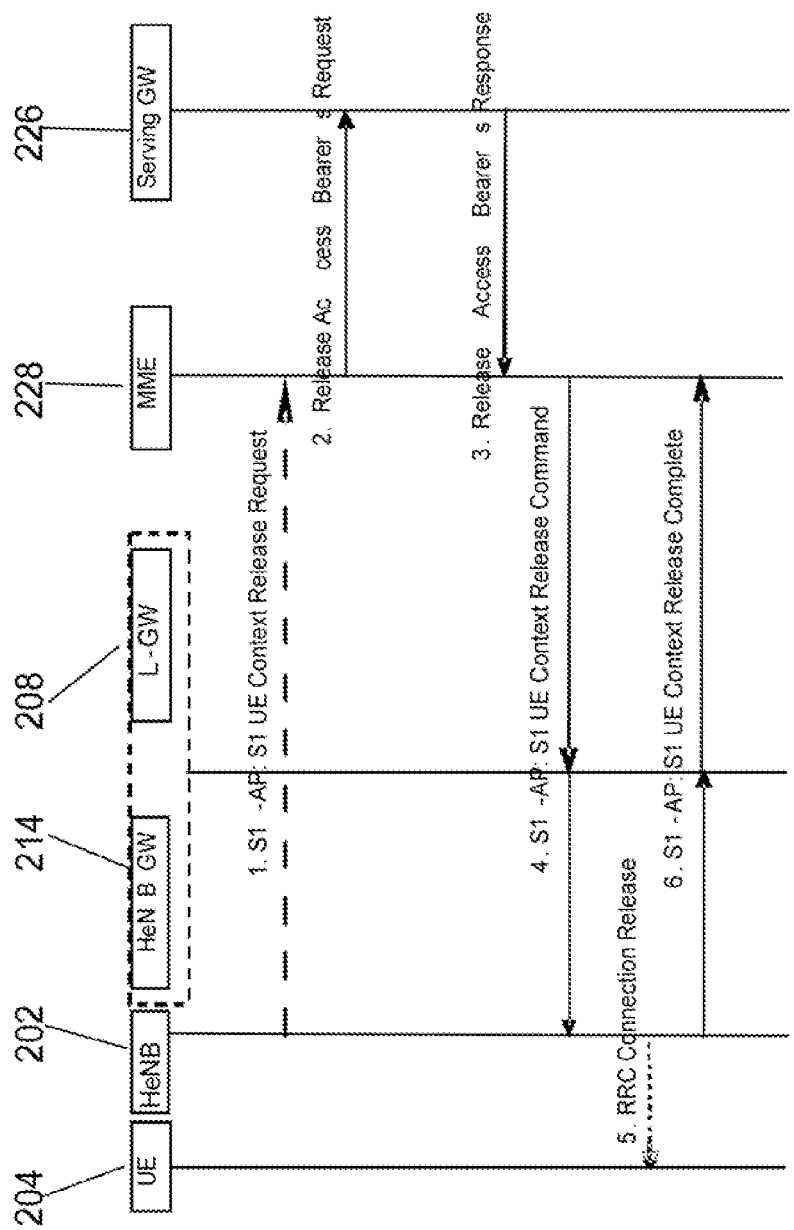
FIG. 5 is a diagram showing example message flows between the wireless communication device and elements of the wireless communication system of FIG. 2 for a release procedure when a device has a packet data network connection via a local network in an enterprise.

FIG. 5 shows an example message flow for a release procedure when a UE has a packet data network connection via a local network in an enterprise (e.g. release from a LIPA connection via local network 210). The steps follow the normal procedure as set out in the equivalent procedure of the Rel-10 LIPA PDN connection flows in 3GPP document TS 23.401 except when the HeNB gateway 214 receives a release command at step 4, the HeNB gateway 214 informs the local gateway 208 to stop sending any downlink data packets for the UE 204 via the direct communication path 220 but to instead forward the packets to the SGW 226.

Figure 6:
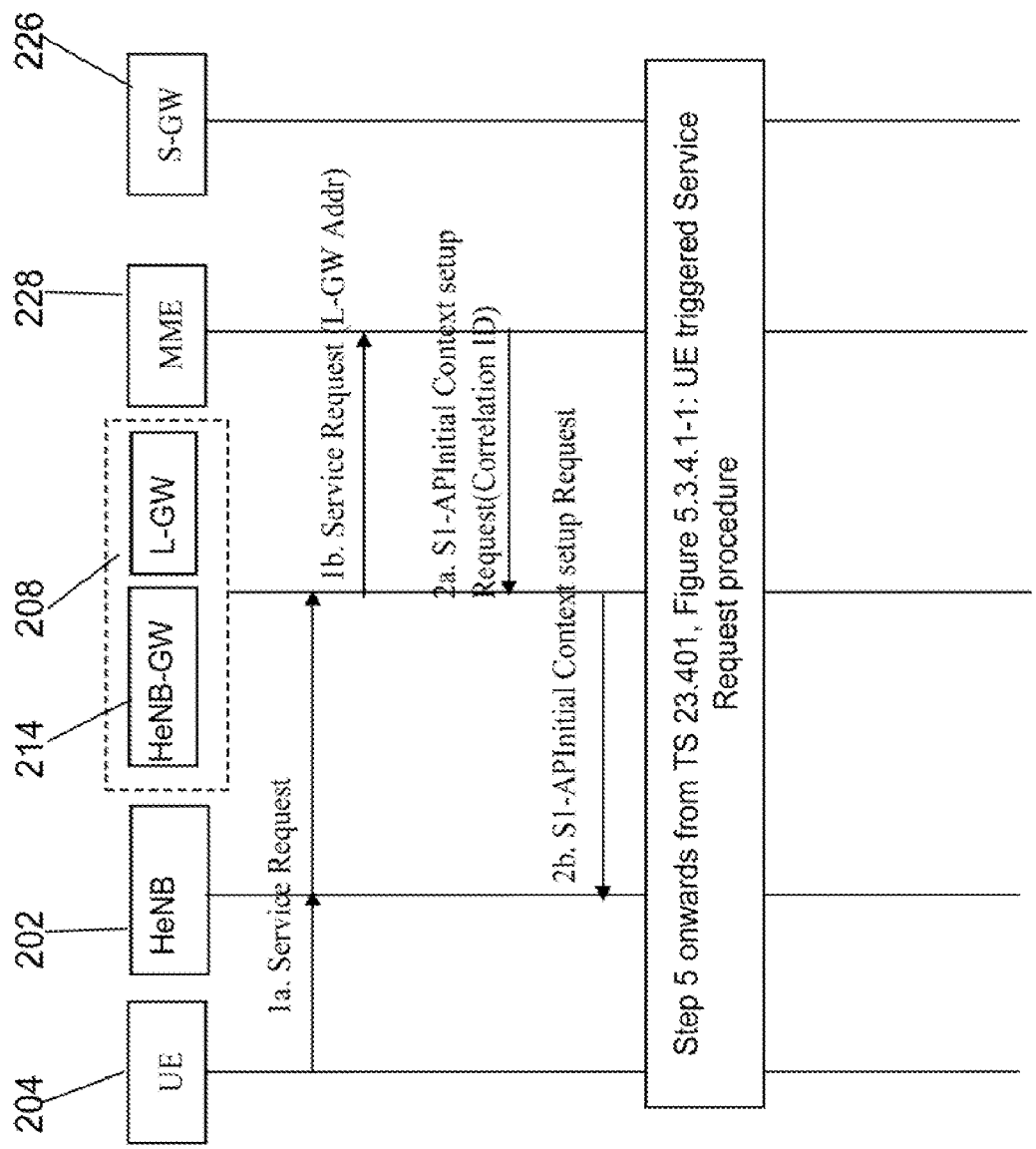
FIG. 6 is a diagram showing example message flows between the wireless communication device and elements of the wireless communication system of FIG. 2 for a procedure involving a device initiated service request with a connection via a local network in an enterprise.

FIG. 6 shows an example message flow for a procedure involving a UE initiated service request with a connection via a local network in an enterprise (e.g. with LIPA connection via local network 210). In step 1a, the UE 204 sends a service request message to the MME 228 via the HeNB 202 to request the setup of a service connection (e.g. radio and S1 connection) to the UE 204. The HeNB gateway 214 receives or intercepts the service request message (which is encapsulated in an S1-mme Uplink NAS transfer message) and updates the S1-mme Uplink NAS transfer message by adding the address of the local gateway 208 (e.g. the IP address associated with the local gateway 208 by a IKEv2 mechanism) and forwards the updated message to the MME 228, step 1b. The steps then follow the normal procedure as set out in the equivalent procedure of the Rel-10 LIPA PDN connection flows in 3GPP document TS 23.401 (see TS 23.401, FIG. 5.3.4.1-1: UE triggered Service Request procedure) except the correlation ID provided by the MIE 228 in a context set up request message to the HeNB gateway 214, step 2, is used by the HeNB gateway 214 to determine which S1-U bearer from the HeNB 202 is to provide the direct path to the local gateway 208. This is similar to the context set up request message described above with respect to FIG. 4 and the bearer set up request message described with respect to FIG. 5. The correlation ID is not forwarded to the HeNB 202 and thus, there is no impact on the HeNB 202. The subsequent steps follow step 5 onwards of the normal procedure as shown in TS 23.401 FIG. 5.3.4.1-1.

Figure 7:
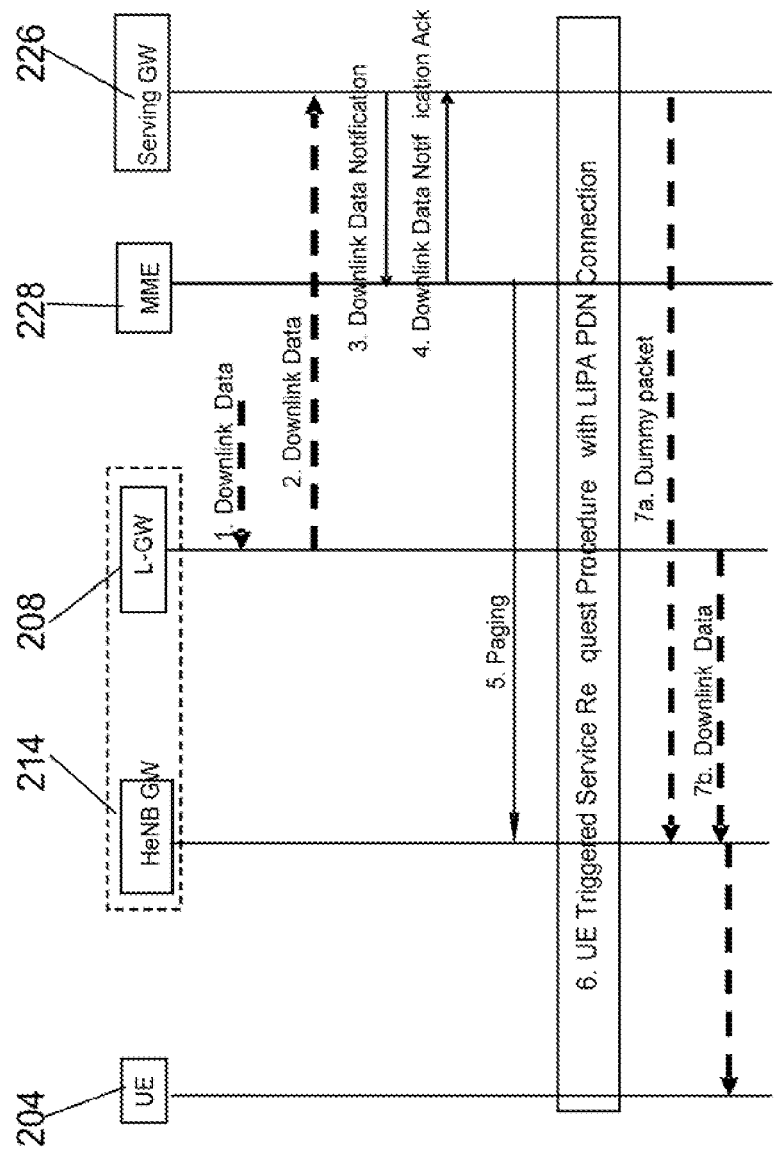
FIG. 7 is a diagram showing example message flows between the wireless communication device and elements of the wireless communication system of FIG. 2 for a procedure involving a network initiated service request with a connection via a local network in an enterprise.

FIG. 7 shows an example message flow for a procedure involving a network initiated service request with a connection via a local network in an enterprise (e.g. with LIPA connection via local network 210). The steps follow the normal procedure as set out in the equivalent procedure of the Rel-10 LIPA PDN connection flows in 3GPP document TS 23.401 and at step 6, follows the procedure involving a UE initiated service request with LIPA connection as described above with reference to FIG. 6. After the UE 204 enters a connected mode with a LIPA connection, downlink data forwarded by the local gateway 208 and buffered in SGW 226 is forwarded to the HeNB 202 if the UE 204 is connected to the same HeNB gateway 214 where the local gateway 208 is collocated. The buffered data is forwarded to the HeNB 202 via the local gateway 208 on the communication path 218. If the UE 204 enters a connected mode with a LIPA connection at a different eNB which is not connected to the HeNB gateway 214 where the local gateway 208 is collocated (the eNB may be outside the enterprise 206 or there may be a plurality of HeNB gateways in the enterprise 206), the MME 228 shall deactivate the LIPA connection and the buffered data in the SGW 226 is dropped.

Figure 8:
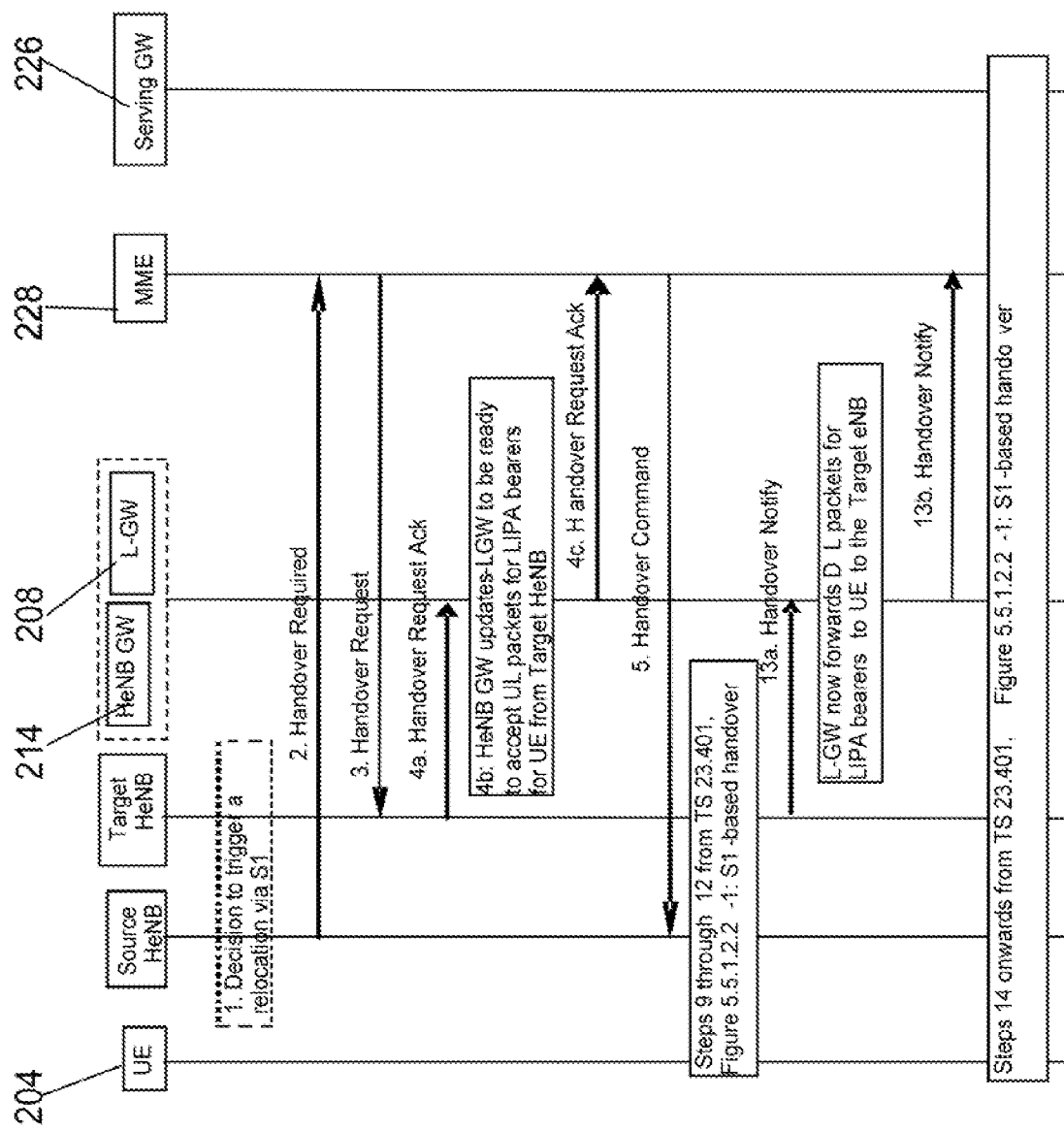
FIG. 8 is a diagram showing example message flows between the wireless communication device and elements of the wireless communication system of FIG. 2 for an inter access point mobility procedure when the source and target access points are coupled to the same access point gateway with a connection via a local network in an enterprise.

FIG. 8 shows an example message flow for an inter HeNB mobility procedure when the source and target HeNBs are coupled to (or controlled by) the same HeNB gateway with a connection via a local network in an enterprise (e.g. with LIPA connection via local network 210). The steps follow the normal procedure as set out in the equivalent procedure of the Rel-10 LIPA PDN connection flows in 3GPP document TS 23.401. At step 1, a decision is made (e.g. in the source or current HeNB or currently serving HeNB) that a handover to a target HeNB is required. At step 2, a handover required message is sent from the source or current HeNB to the MME 228. The handover required message includes the identity of the target HeNB. Based on the handover required message, the MME 228 recognizes that the target HeNB is connected to the same HeNB gateway 214 (for example, based on Tracking Area Identity Information or S1-mme configuration setup, or the local gateway address associated with the target HeNB) as the current HeNB. When the target HeNB and source HeNB are connected to the same HeNB gateway 214, the MME 228 allows handover also for the existing LIPA connections and sends a handover request message to the target HeNB, step 3. In all other cases, for example, the target cell is not served by a HeNB which is connected to the same HeNB gateway as the source or current HeNB, the MME 228 does not include LIPA bearer(s) in the Bearer Context set up message and releases the LIPA connection by triggering the MME requested packet data network (PDN) disconnection procedure specified in section 5.10.3 of TS 23.401, after the handover procedure. For the case when handover for existing LIPA connections are allowed, in step 4a, a handover request acknowledgement message is sent by the target HeNB to the HeNB gateway 214. On receiving the handover request acknowledgment message for a UE with LIPA connections, the HeNB gateway 214 notifies the local gateway 208 to be ready to communicate with the target HeNB instead of the current HeNB (e.g. accept uplink data from the target HeNB instead of the current HeNB). For example, the handover request acknowledgement message includes the bearer identities which are being handed over to the target HeNB so the HeNB gateway 214 updates the local gateway 208 to be ready to accept uplink packets for the identified LIPA bearers from the target HeNB instead of from the current HeNB, step 4b. The HeNB gateway 214 then sends a handover request acknowledgement message to the MME 228, step 4c. In step 5, the MME 228 sends a handover command message to the current HeNB to complete the handover. The steps then follow the normal procedure as set out in the equivalent procedure of the Rel-10 handover flows in 3GPP document TS 23.401 (see steps 9 to 12 in TS 23.401 FIG. 5.5.1.2.2-1: S1-based handover) until a new step 13a in accordance with the disclosure in which a handover notify message is sent by the target HeNB to the HeNB gateway 214. On receiving the handover notify message for a UE with LIPA connections, the HeNB gateway notifies the local gateway 208 to communicate data for the UE with the target HeNB (e.g. forward downlink data to the target HeNB), step 13b. For example, the handover request acknowledgement message includes the bearer identities which are being handed over to the target HeNB so the HeNB gateway 214 updates the local gateway 208 to forward downlink packets for the identified LIPA bearers to the target HeNB instead of to the current HeNB. The HeNB gateway 214 then forwards a handover notify message to the MME 228, step 13c. The steps then follow the normal procedure as set out in steps 13 onwards in TS 23.401 FIG. 5.5.1.2.2-1: S1-based handover of TS 23.401).

Figure 11:
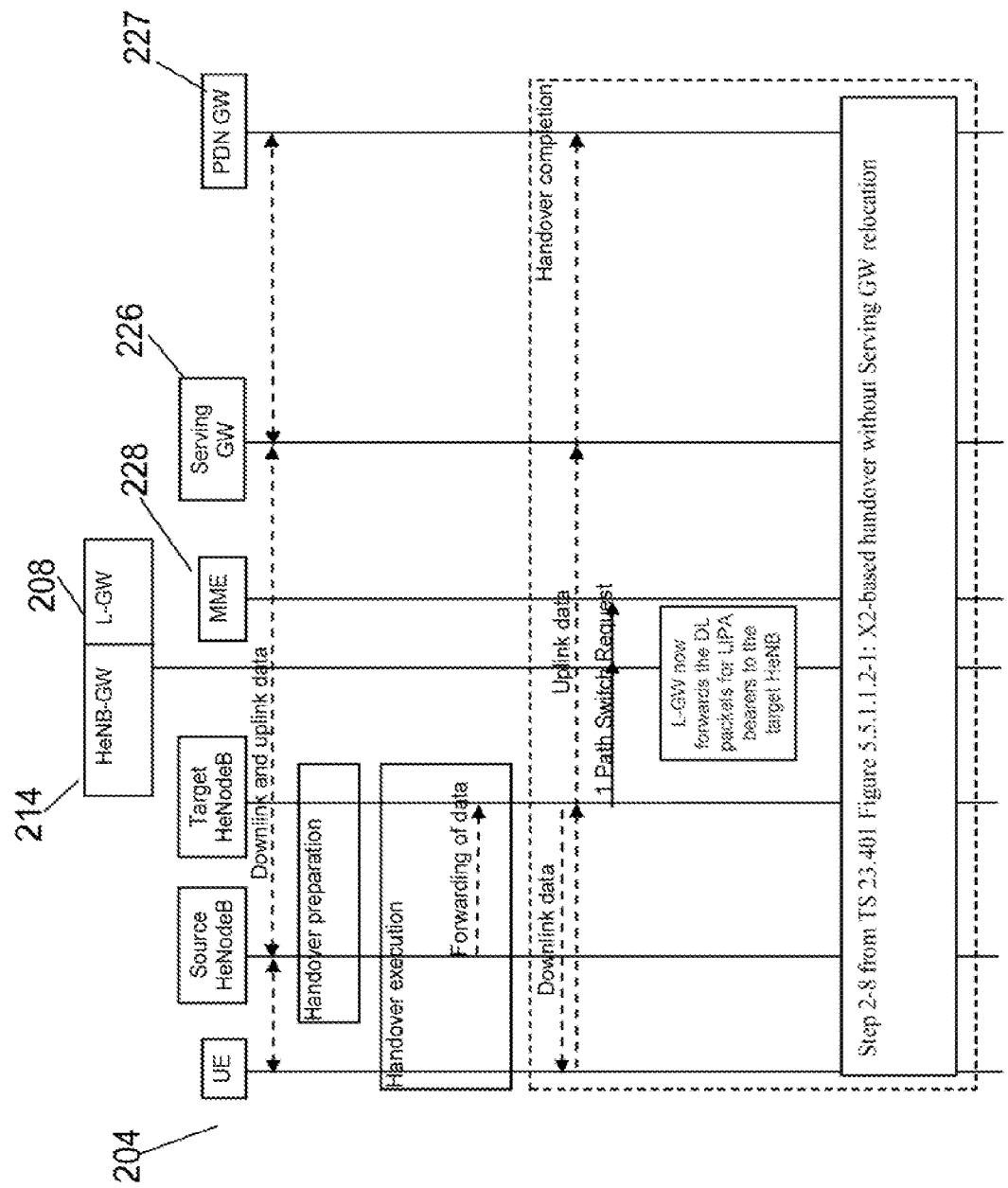
FIG. 11 is a diagram showing another example of message flows between the wireless communication device and elements of the wireless communication system of FIG. 2 for an inter access point mobility procedure when the source and target access points are coupled to the same access point gateway and have a direct connection between them via a local network in an enterprise.

FIG. 11 shows another example of a message flow for an inter HeNB mobility procedure via a direct connection between two HeNBs when the source and target HeNBs are coupled to (or controlled by) the same HeNB gateway. The steps follow the normal procedure as set out in the equivalent procedure of the X2 HO flow in 3GPP document TS 23.401. In step 1, the target HeNB sends a path switch request message to the MME 228 via the HeNB gateway 214. On receiving the path switch request message for a UE with LIPA connections, the HeNB gateway 214 notifies the local gateway 208 to be ready to communicate with the target HeNB instead of the current or source HeNB (e.g. accept uplink data from the target HeNB instead of the current HeNB). For example, the path switch request message includes the bearer identities which are being handed over to the target HeNB so the HeNB gateway 214 updates or notifies the local gateway 208 to be ready to accept uplink packets for the identified LIPA bearers from the target HeNB instead of from the current HeNB. The HeNB gateway 214 also notifies the local gateway 208 to communicate data for the UE 204 with the target HeNB, e.g. forward downlink packets for the identified LIPA bearers to the target HeNB instead of to the current HeNB. The steps then follow the normal procedure as set out in Step 2 onwards in TS 23.401 FIG. 5.5.1.1.2-1: X2-based handover without Serving GW relocation.

In a further implementation, the HeNB gateway may terminate the path switch request message from the source HeNB, and not forward it to the MME 228. In this case, the HeNB gateway 214 will then send the path switch request acknowledgement message to the target HeNB to end the whole procedure.

Thus, in the case of a handover, the HeNB gateway 214 is arranged to facilitate the handover from the source HeNB to the target HeNB by notifying the local gateway 208 that the communication path has changed to between the target HeNB and the local network 210. In other words, the HeNB gateway 214 is arranged to selectively route data via a communication path between the target HeNB and the local network 210 based on a received control message (e.g. the handover request acknowledgement message received from the target HeNB as in the arrangement shown in FIG. 8 or the path switch request message as in the arrangement shown in FIG. 11) instead of via a communication path between the source HeNB and the local network 210.

Thus, the mobility of a UE's LIPA connection via the local network 210 inside the enterprise 206 is supported for handovers between HeNBs connected to the same HeNB gateway 214. In other words, the wireless communication system 200 can provide continuous local IP connectivity as a user moves across the multiple HeNBs 202 in the enterprise 206. The MME 228 supports this mobility either by knowing which of the HeNBs are supported under the same HeNB gateway 214 (S1-mme Setup) or by correlating or determining that the local gateway address is the same for HeNBs under the same HeNB gateway 214, for example, when the local gateway address is included in control messages to the MME 228.

It will be appreciated that the anchoring of inter HeNB mobility is facilitated by the HeNB gateway. In an arrangement in which the local gateway 208 is collocated with the HeNB gateway 214, no further updates are needed to manage the mobility of the LIPA connection.

In another embodiment (not shown in the above message flow figures), the HeNB gateway 214 may be arranged to not update the received or intercepted control messages. In this embodiment, the HeNB 202 instead may be arranged to add the local gateway address to the S1-mme control messages sent by the HeNB 202 to the EPC 216 via the HeNB gateway 214. The HeNB 202 may be provided with the address of the local gateway, for example, via operations and management. In addition, the correlation ID received from the MME 228 may not be removed by the HeNB gateway 214 so that the correlation ID is provided to the HeNB 202. However, the HeNB 202 does not need to process the correlation ID. As with the embodiment described above with reference to FIGS. 3-8, in this another embodiment, the HeNB gateway 214 selectively routes data via the communication path between the HeNB 202 and the local network 210 via the local gateway 208 in response to the correlation ID in the received control messages.

Figure 9:
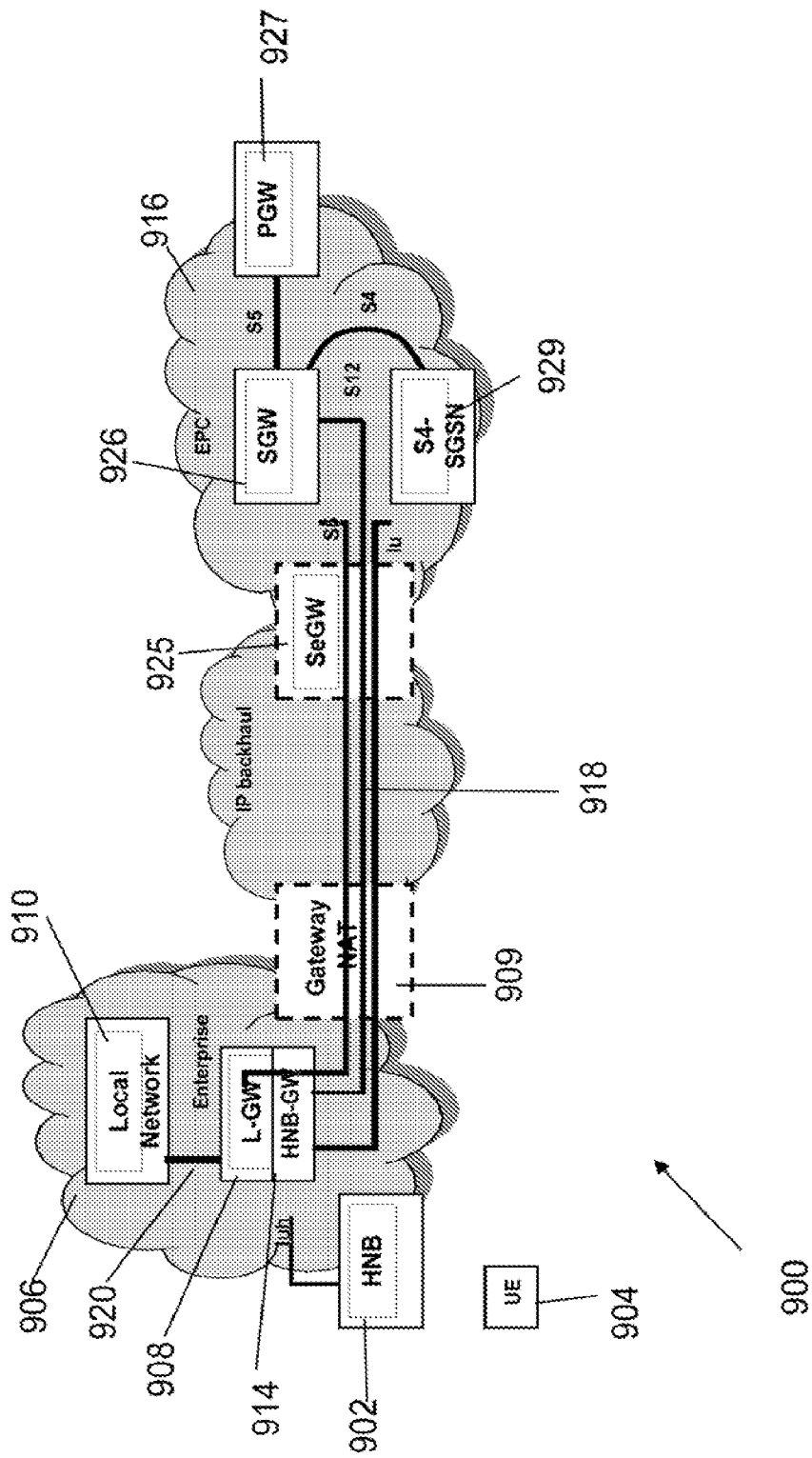
FIG. 9 is a block schematic diagram of a UMTS system using S4-SGSN in accordance with an example embodiment of the present disclosure.

FIG. 9 shows an example arrangement in which the wireless communication system 100 is a UMTS system in accordance with a first example embodiment which uses a Serving GPRS Support Node (SGSN) known as a S4-SGSN. Like elements to those of FIG. 1 are referenced by the same reference numeral plus the number 800 and the comments and description in relation to FIG. 1 (and FIGS. 2-8) apply similarly to the system of FIG. 9. In this example arrangement, each of the access points 902 include a HNB and a radio network controller RNC (not shown) and the access point gateway 914 is a HNB gateway 914. In the following, the access points 902 will be referred to as HNBs 902. Similar functions to those performed by the controlling entity MME 228 in the LTE embodiment are performed by the S4-SGSN 929.

In an example arrangement, the HNB gateway 914 is located in the enterprise 906 and may be collocated with the local gateway 908. Furthermore, the SeGW 925 may maintain a secure association with the HNB gateway 914 instead of the HNB 902 across the IP backhaul network. As with the LTE embodiment, IKEv2 mechanisms can be used to request one IP address each for the HNB gateway 914 and the local gateway 908. The assigned local gateway address is signalled to the S4-SGSN 929 via Iu by the HNB gateway 914 (and not the HNB) in UE-associated signalling or control messages. The S4-SGSN 929 uses the information from the HNB 902 to override the normal PGW selection algorithms.

The HNB gateway 914 includes the functions of a HNB gateway, for example, the signalling and user plane interface between the HNB 902 and the HNB gateway 914 is the Iuh interface. In addition, the HNB gateway 914 may perform the following functions: the HNB gateway 902 intercepts or receives the initial UE request message from the HNB 902 (RANAP message) and updates the received message by adding the address of the local gateway 908 to the received message; the HNB gateway 902 determines which message from the S4-SGSN 929 contains a correlation identifier (ID) for the UE's traffic to the local network 910 and using this identifier selectively routes data to the local gateway 908 rather than the SGW 926 in the core network 916; when a UE 904 hands over from one HNB 902 to another HNB under the same HNB gateway 914, the S4-SGSN 929 determines that the HNB is coupled to or controlled by the same HNB gateway 914 and provides the signalling or control messages to enable continuity of the UE's traffic to the local network 910.

The correlation ID provided by the S4-SGSN 929 to the HNB 902 for the residential LIPA implementation, is used by the HNB gateway 914 (and not forwarded to the HNB), to determine which S1-U bearers from the HNB 902 should use the direct communication path 920 between the HNB gateway 914 and the local network 910.

The mobility of UE's LIPA packet data network (PDN) connection inside the enterprise 906 is supported for hand overs between HNBs 902 connected to the same HNB gateway 914. The S4-SGSN 929 supports this mobility either by knowing which of the HNBs 902 are supported under the same HNB gateway 914 (S1-mme Setup) or by correlating or determining that the local gateway address is the same for HNBs 902 under the same HNB gateway 914.

Figure 10:
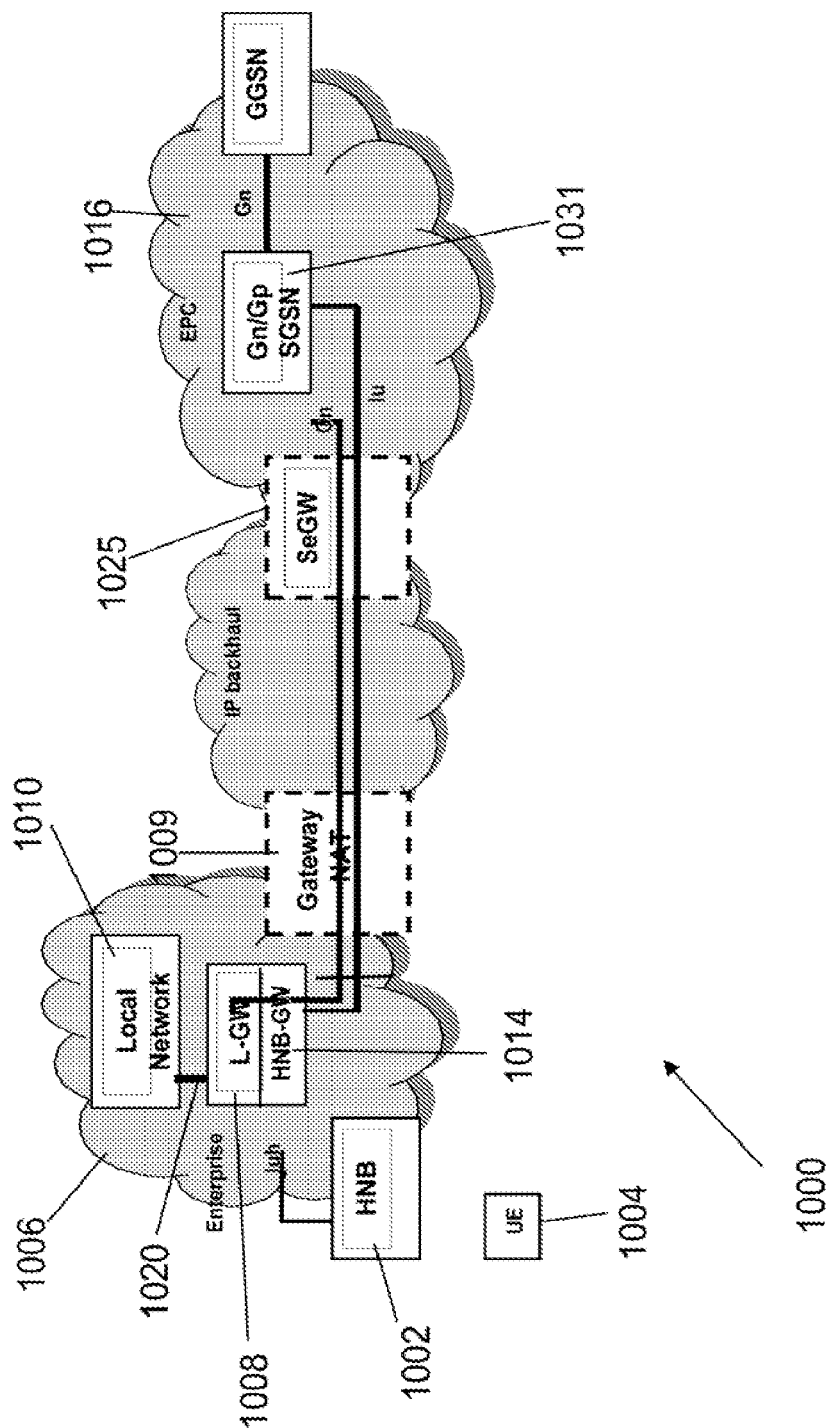
FIG. 10 is a block schematic diagram of a UMTS system using a Gn/Gp-SGSN in accordance with an example embodiment of the present disclosure.

FIG. 10 shows an example arrangement in which the wireless communication system 100 is a UMTS system in accordance with a second example embodiment which uses a Gn/Gp-SGSN. Like elements to those of FIG. 1 are referenced by the same reference numeral plus the number 900 and the comments and description in relation to FIG. 1 (and FIGS. 2-9) apply similarly to the system of FIG. 10. In this example arrangement, each of the access points 1002 include a HNB and a radio network controller RNC (not shown) and the access point gateway 1014 is a HNB gateway 1014. Similar functions to those performed by the controlling entity MME 228 and the user plane entity SGW 226 in the LTE embodiment are performed by the Gn/Gp-SGSN 1031.

The methods shown and described with reference to FIGS. 3-8 are very similar when applied to a UMTS embodiment (such as system 900 or 1000) or other similar communication system.

In summary, the access point gateway is located in the enterprise and facilitates the selective routing of data between the access points and the core network and/or the local network. The access point gateway can therefore facilitate access to a local network (e.g. LIPA). The access point gateway is further arranged to anchor the handovers between access points connected to the access point gateway and thus, the access point gateway can control connections within the enterprise such that an established LIPA connection can be maintained when a UE hands over between access points in the enterprise.

An advantage of the arrangement in accordance with an embodiment of the disclosure in which the access point gateway updates the control messages between the access point and the core network is that the access point (for example, the HeNB or HNB) is not impacted by this solution. This means that no changes are required to be made to the access point nor its interface (e.g. HeNB sends data on S1-U interface as in current behaviour).

The updates to the control messages (e.g S1-mme messages) exchanged between the core network and the access points to support LIPA are made by the access point gateway and are transparent to the access points. In other words, the access point gateway makes the changes to the control messages exchanged between the core network and the access point gateway and so can hide the changes on the control messages from the access points.

Inter-access point mobility is supported for access points connected to the same access point gateway such that data traffic communicated via the local network is sustained after handover. The wireless communication system in accordance with the disclosure can provide continuous local IP connectivity as a user moves across the multiple access points in an enterprise.

It is noted that the term 'cell' as used herein is not intended to limit the disclosure to a cellular communication system but should be interpreted broadly as meaning a communication area served by one or more base stations such that a communication device located anywhere in the communication area or cell may communicate with at least one of the one or more of the base stations.

It will be appreciated that the core network 218 may manage additional or alternative radio access networks RANs to the UTRAN/EUTRAN. Examples of other RANs include GSM access network (including GSM/EDGE RAN (GERAN)), CDMA 1x, CDMA EV-DO, HSPA (HSDPA/HSUPA) access networks, WLAN access network, Wi-Max access network.

In the foregoing specification, the invention has been described with reference to specific examples of embodiments of the invention. It will, however, be evident that various modifications and changes may be made therein without departing from the broader scope of the invention as set forth in the appended claims.

Some of the above embodiments, as applicable, may be implemented using a variety of different processing systems. For example, the Figures and the discussion thereof describe an exemplary architecture and method which is presented merely to provide a useful reference in discussing various aspects of the disclosure. Of course, the description of the architecture and method has been simplified for purposes of discussion, and it is just one of many different types of appropriate architectures and methods that may be used in accordance with the disclosure. Those skilled in the art will recognize that the boundaries between program elements are merely illustrative and that alternative embodiments may merge elements or impose an alternate decomposition of functionality upon various elements.

The invention claimed is:

1. A wireless communication system comprising:
a plurality of access points located within an enterprise, for communicating with a plurality of wireless communication devices within the enterprise;
a local gateway for providing access to a local network within the enterprise; and
an access point gateway, located in the enterprise, coupled to the local gateway and communicably coupled to each of the plurality of access points, and for coupling to a core network of the wireless communication system, wherein, in response to a received control message the access point gateway is configured to selectively route data via a communication path within the enterprise between the plurality of access points and the local network via the local gateway.

2. The wireless communication system according to claim 1, wherein the local gateway and the access point gateway are collocated.

3. The wireless communication system according to claim 1, wherein the local gateway is coupled to the local network.

4. The wireless communication system according to claim 1, wherein the local gateway is positioned within the communication path between the plurality of access points and the local network.

5. The wireless communication system according to claim 4, wherein the access point gateway controls the communication path within the enterprise by selectively routing data through the communication path based on one or more control messages sent between the core network and the plurality of access points via the access point gateway.

6. The wireless communication system according to claim 5, wherein the access point gateway controls a second communication path between the plurality of access points and the core network by selectively routing data through the second communication path based on the one or more control messages sent between the core network and the plurality of access points via the access point gateway.

7. The wireless communication system according to claim 6, wherein the one or more control messages include a set up request message including a correlation identifier provided by the core network and wherein when the access point gateway receives the set up request message including a correlation identifier from the core network, the access point gateway is arranged to selectively route data based on the correlation identifier from the core network.

8. The wireless communication system according to claim 7, wherein the correlation identifier identifies a radio access bearer, the radio access bearer being one of plurality of radio access bearers for routing data via the communication path within the local network.

9. The wireless communication system according to claim 6, wherein the access point gateway or the one or more access points are further arranged to update the one or more control messages and to forward on the updated control messages.

10. The wireless communication system according to claim 6, wherein the one or more control messages include a request message received from an access point and wherein when the access point gateway receives a request message from an access point, the access point gateway is arranged to update the received request message by adding an address of the local gateway to the received request message before forwarding the updated request message to the core network.

11. The wireless communication system according to claim 7, wherein when the access point gateway receives the set up request message, the access point gateway is arranged to update the received set up request message by removing the correlation identifier from the received set up request message before forwarding the updated set up request message to an access point.

12. The wireless communication system according to claim 1, wherein when a decision is taken to handover a wireless communication device having an established connection to the local network via a communication path through a current access point of the plurality of access points, the access point gateway and the local gateway, to a target access point of the plurality of access points, the access point gateway is arranged, in response to a control message received from the target access point, to notify the local gateway to communicate with the target access point instead of the current access point such that the established connection to the local network is maintained via the target access point, the access point gateway and local gateway.

13. The wireless communication system according to claim 12, wherein when a decision is taken to handover a wireless communication device, the source access point is arranged to send a handover required message to the core network, the core network is arranged to send, in response to receiving a handover required message, a handover request message to the target access point when the target access point and source access point are both controlled by the access point gateway, and the target access point is arranged to send, in response to receiving a handover request message, a handover request acknowledgement message to the access point gateway, wherein the access point gateway is arranged to notify the local gateway to communicate with the target access point in response to receiving the handover request acknowledgement message.

14. The wireless communication system according to claim 12, wherein when a decision is taken to handover a wireless communication device from a source access point to a target access point with both access points being controlled by the access point gateway, the target access point is arranged to send a path switch request message to the access point gateway, wherein the access point gateway is arranged to notify the local gateway to communicate with the target access point in response to receiving the path switch request message.

15. The wireless communication system according to claim 1, wherein the local network is connected to an external network through one or more network attachment switches.

16. A method of routing data in a wireless communication system, the method comprising:
receiving at an access point gateway located in an enterprise, control messages sent between a core network and a plurality of access points located in the enterprise via the access point gateway; and
based on one of the control messages received at the access point gateway, selectively routing within the enterprise, by the access point gateway, data via a communication path between the plurality of access points and a local network within the enterprise via a local gateway located within the enterprise.

17. The method according to claim 16, wherein the received control message is from the core network, and the received control message includes a set up request message including a correlation identifier provided by the core network.

18. The method according to claim 17, wherein selectively routing includes selectively routing data via the communication path based on the received correlation identifier from the core network.

19. The method according to claim 16, further comprising updating by the access point gateway or one of the plurality of access points, the received control messages and forwarding on the updated control messages.

20. The method according to claim 16, wherein the control messages include a request message received from an access point and wherein updating includes updating by the access point gateway the received request message by adding an address of the local gateway to the received request message before forwarding the updated request message to the core network.

\* \* \* \* \*